United States Patent Office 2,927,870
Patented Mar. 8, 1960

2,927,870

ZIRCONIUM ACETATE-ZINC ACETATE CATALYZED ORGANOHYDROGENOSILOXANE EMULSIONS AND THE TREATMENT OF FABRICS THEREWITH

Hervey F. Beutler, Saginaw, Mich., assignor to Dow Corning Corporation, Midland, Mich., a corporation of Michigan No Drawing. Application August 28, 1956
Serial No. 606,572

12 Claims. (Cl. 117—135.5)

This invention relates to a novel catalyst useful in aqueous organohydrogenosiloxane emulsions and to the treatment of fabrics with emulsions which are so catalyzed.

The use of organohydrogenosiloxanes to render fabrics water repellent is now well known, and such use has become widely adopted in the textile industry. Various modifications of this treatment have also been adopted by the industry, e.g. the incorporation of organopolysiloxane fluids and resins which do not contain silicon bonded hydrogen in accordance with U.S. Patents 2,588,365 and 2,588,366. A modification in which hydroxylated organopolysiloxane fluids (i.e. fluids containing silicon bonded hydroxyl groups) are incorporated in the treatment has been found to give greatly improved resistance to grease spotting and to the shrinkage of wool during laundering. The latter modification is described in detail in the copending application of F. L. Dennett, Serial No. 454,613, filed September 7, 1954, now Patent No. 2,807,601 and assigned to the assignee of this invention.

A major problem in the above described fabric treatments has been the high temperature and/or length of time required to satisfactorily cure the organosiloxanes so that maximum water repellency and retention of that water repellency through laundering or dry cleaning is obtained. The use of catalysts (such as the acetates, octoates, and naphthenates of lead, iron, zinc, manganese, and cobalt) has been proposed to speed up the curing rate of the organosiloxanes in question. Even when such catalysts are used, however, temperatures in the region of 250° to 350° F. are generally necessary to obtain the required cure in a sufficiently short time to be practical in commercial operations.

The commercial method by which treatments of the type in question are carried out is known as "sponging" or "padding." In essence, this consists of running the fabric through the treating bath, then through squeeze rollers, and finally through a curing oven. A large share of the sponging plants in the textile industry are not equipped to heat their treated fabrics at any temperature above about 200° F., and many cannot attain any temperature substantially above 175° F. As a consequence, in a large segment of the industry the use of organosiloxanes in the treatment of fabrics has never been practical.

The solution of this problem has been complicated by the fact that the sponging plants are not generally equipped to handle organic solvents in their treating baths, and accordingly they must use aqueous emulsions. Hence any catalyst employed must be capable of being easily and homogeneously incorporated in the organosiloxane emulsion employed. Furthermore the catalyzed emulsion must be stable over a considerable period of time, so that there is absolutely no chance of the emulsion's breaking into its separate components during the sponging operation. Also the catalyzed emulsion must remain stable after the addition of additives such as flame retardants, sizing agents, and organic resins such as urea-formaldehyde, melamine-formaldehyde, and the like, which are conventionally incorporated to modify various properties of the fabric. It is also important that the catalyzed emulsion be one which will bring about suitable results on a wide range of different fibers, i.e. natural and synthetic fibers and blends thereof.

Although some of the known organosiloxane catalysts, when used in sufficient concentration and under the proper conditions, may be able to reduce the curing time and temperature of an organohydrogenosiloxane emulsion treatment to the desired extent, such catalysts have not solved the above discussed problems because the resulting emulsions are deficient in one or more of the other necessary properties.

It is an object of the present invention to provide an improved catalyst for use in organohydrogenosiloxane emulsions. A further object is the provision of a catalyzed organohydrogenosiloxane emulsion which can contain, if desired, other organosiloxane fluids or resins and other conventional additives and which will be stable as an emulsion but which is readily cured at low temperatures to provide a high degree of water repellency on a wide variety of fabrics immediately after cure. Another object is the provision of a catalyzed organohydrogenosiloxane emulsion which can be used to render nontextile fabrics, such as suede leather, water repellent.

In accordance with this invention, it has been found that the above and other objects can be attained by incorporating both zirconium acetate and zinc acetate in the discussed organohydrogenosiloxane emulsions in a ratio such that there is provided from 0.1 to 4.5 zinc atoms per zirconium atom. The results obtained by using both of these salts in the emulsion are extremely surprising, for a relatively stable emulsion is produced in spite of the fact that the use of zinc acetate alone has been found to provide a very unstable emulsion which readily breaks down into its component parts. Another peculiarity of this mixture of salts lies in the fact that when zirconium acetate alone is employed as the catalyst in an organohydrogenosiloxane emulsion, many fabrics when treated with said emulsion and cured at, e.g., 200° F. for 10 minutes, require an additional 24 hours' aging at room temperature after the cure in order to develop the desired degree of water repellency. When both salts are present as the catalyst, an identical treatment provides immediate water repellency of the desired degree without the aging period. This difference is of great importance in the textile industry, where the spongers wish to keep a continuous check on the results which are being obtained in the treatment, and where holding the treated goods for a 24 hour period is often highly impractical.

Thus this invention is particularly concerned with an aqueous emulsion in which the nonaqueous constituents are comprised of (1) an organopolysiloxane fluid having the general formula

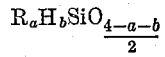

wherein R is selected from the group consisting of alkyl radicals of from 1 to 5 inclusive carbon atoms and aryl radicals, there being not more than 10 molar percent of aryl substituted Si atoms present, $a$ has a value of from 1.0 to 1.5 inclusive, $b$ has a value of from 0.75 to 1.25 inclusive, and the sum of $a$ and $b$ has a value of from 2.0 to 2.25 inclusive, (2) zirconium acetate and zinc acetate in a ratio of from 0.1 to 4.5 inclusive zinc atoms per zirconium atom, and (3) an emulsifying agent. As with most catalytic systems, the presence of any amount of the catalysts has an effect on the product. Ordinarily, however, it is preferred to use sufficient zirconium acetate to provide at least 0.25 percent by weight zirconium calculated as the elemental metal based on the total organopolysiloxanes present, and there is usually no advantage in using more than 30 percent by weight. The very best results come from the use of from 1 to 7 percent zirconium on this basis.

The zirconium acetate which has been referred to above can be obtained from the reaction of basic zirconyl hydroxide with acetic acid in accordance with the equation:

$$Zr_2O_3(OH)_2 + 4HC_2H_3O_2 \rightarrow 2H_2ZrO_2(C_2H_3O_2)_2 + H_2O$$

It is well known that the literature and nomenclature of zirconium compounds is in a highly confused state, and is full of many contradictions. Thus it is to be understood that the product formula shown in the above equation is more of an empirical formula than a structural formula, and the applicant is not bound to the use of compounds of this exact structure. The zirconium salt as employed herein is always employed in the presence of water. It has been reported that in aqueous solution the equilibrium:

$$H_2ZrO_2(C_2H_3O_2)_2 \rightleftharpoons HZrO_2C_2H_3O_2 + HC_2H_3O_2$$

appears to occur [Peyronel, GAZZ. chim. ital., 72, 89–93 (1942)]. The equilibrium salt in the above equation is sometimes designated by the structural formula $ZrOOHC_2H_3O_2$. The salt employed herein, whether in aqueous solution or not, is often referred to as zirconyl acetate rather than zirconium acetate.

Regardless of the true nature of the structure of the compound as it exists in aqueous solution, and regardless of the nomenclature employed, the salt which is used herein does have the empirical formula $$H_2ZrO_2(C_2H_3O_3)_2$$

and is commercially available as an aqueous solution containing up to 25–30 percent by weight $ZrO_2$. A satisfactory commercial salt is marketed as "zirconium acetate" by the Titanium Alloy Manufacturing Division of the National Lead Company. The latter product is an aqueous solution containing 13.1 percent by weight of $ZrO_2$ (i.e. 9.7 percent Zr) and 71.05 percent water. It is to be understood that the salt as employed herein can contain the usual impurities found in the commercial products, e.g. small amounts of silicon, titanium, iron, calcium, and sodium, and substantial quantities of antimony.

The zinc acetate employed herein can be used in either of the two usual commercial forms, i.e. the anhydrous or hydrated $[Zn(O_2C_2H_3)_2 \cdot 2H_2O]$ forms. The very optimum results with the combination of salts seem to be obtained when the salts are present in a ratio which provides from 0.5 to 1 zinc atom per zirconium atom.

The salts can be incorporated into the defined emulsions by any suitable manner. Since an aqueous solution of the zirconium acetate is the commercially available form, it is preferred to add the desired amount of zinc acetate to the zirconium acetate solution prior to incorporating the mixture of catalysts into the emulsion, although this technique is not necessarily followed. In the treatment of many fabrics it has been found that even better results are obtained if the zinc acetate and zirconium acetate are heated in water at a temperature of from 35° to 100° C. (most preferably at about 50° C.) for a short period, e.g., 10 minutes to 1 hour, prior to incorporating the catalyst mixture into the organosiloxane emulsion. It has been found that improved results can also be obtained if the two salts are allowed to stand at room temperature in a single aqueous solution for a longer time (e.g. 24 hours) prior to their incorporation.

The improvements brought about by contacting these two salts for a considerable period at room temperature, or for a short period at a more elevated temperature, seem to indicate that a reaction product or complex of some kind is formed between the zirconium acetate and zinc acetate, even though there is no indication in the literature nor any of the usual analytical evidence that such complexes exist. The formation of a complex of some sort is also indicated from the fact that relatively concentrated solutions of zirconium acetate (e.g. containing 70 percent water) when heated with a relatively high ratio of zinc acetate (e.g. to furnish 4 zinc atoms per zirconium atom) form a clear solution which upon cooling takes the form of a thick cream of a rather pinkish-white color. The latter cream, upon further dilution with water, again forms a clear solution.

Regardless of whether or not a true complex reaction product is formed when the two salts employed herein are present together in an aqueous system, unexpected and improved results over the comparable results of the prior art are obtained when the alleged complex is not preformed. Thus the invention is inclusive of those emulsions which are prepared by merely separately incorporating the two salts into the emulsion in question.

The organopolysiloxanes of the formula $$R_aH_bSiO_{\frac{4-a-b}{2}}$$

which are employed herein are well known materials and many such are commercially available. Fluids of this type can be produced by the hydrolysis and condensation of one or more silanes of the formula $$RHSiCl_2$$

or by the cohydrolysis and co-condensation of such silane with chlorosilanes such as $R_3SiCl$, $R_2HSiCl$, $RH_2SiCl$, $R_2SiCl_2$, and $RSiCl_3$ (or their oxylated derivatives) in proportions such that the defined average values of $a$ and $b$ are maintained in the resulting copolymers. The R radicals in the above formulas can be alkyl radicals such as methyl, ethyl, isopropyl and amyl, and aryl radicals such as phenyl and xenyl, provided, however, that there should not be more than 10 molar percent of aryl substituted silicon atoms present in the polymer. The most preferred polymers of this type are the methylhydrogenopolysiloxanes, i.e. those containing the repeating structural units $(CH_3)HSiO$, particularly the linear polymers of such a structure which are end-blocked with trimethylsiloxy groups. It is to be understood, of course, that a mixture of any of the above defined polymers can be employed if desired.

As is well known in the art, certain beneficial results can be obtained when fabrics are treated with an organohydrogenosiloxane of the defined type in conjunction with organosiloxane fluids and/or resins containing units of the formula $$R'_ySiO_{\frac{4-y}{2}}$$

where R' is an aliphatic hydrocarbon radical of from 1 to 5 inclusive carbon atoms or an aryl radical, with preferably no more than 10 molar percent of aryl substituted silicon atoms present in the polymer, and where $y$ is an integer of from 0 to 3 inclusive. It is to be understood that one or more polymers of the latter type can be incorporated into the emulsions of this invention, and the polymers can either be entirely fluid in nature (e.g. where $y$ has an average value of from 2 to 2.1 inclusive) or entirely resinous in nature (e.g. where $y$ has an average value of from 1.0 to 1.25 inclusive), or one or more of both the fluid and resinous types can be used. The R' radicals can be, e.g., any of those radicals listed above as illustrative of the R radicals, but they also include the unsaturated aliphatic hydrocarbon radicals such as vinyl, allyl, cyclohexenyl, etc. The most preferred organosiloxanes employed as additives to the organohydrogenosiloxane emulsion are those in which all of the R' groups are methyl.

In the treatment of fabrics with the defined emulsions, the very best results have been obtained from systems in which the organosiloxane constituents consist essentially of a mixture of from 5 to 80 percent by weight of the above defined $$R_aH_bSiO_{\frac{4-a-b}{2}}$$

type polymers and from 20 to 95 percent by weight of (A) an organopolysiloxane fluid having a viscosity of from 1,000 to 100,000 cs. at 25° C. and having the general formula $$R'_xSiO_{\frac{4-x}{2}}$$

where R' is as above defined and $x$ has a value of from 2.0 to 2.1 inclusive, and/or (B) an hydroxylated organopolysiloxane fluid having a viscosity of less than 1,000,000 cs. at 25° C. and having an average of from 1.4 to 2 inclusive (preferably from 1.98 to 2) organic radicals attached to silicon per silicon atom where said organic radicals are aliphatic hydrocarbon radicals of from 1 to 5 inclusive carbon atoms or aryl radicals, where again there is no more than 10 molar percent of aryl substituted silicon atoms present. The highest degree of water repellency is usually obtained when the organohydrogenosiloxane constitutes from 40 to 60 percent by weight of the total organosiloxanes present.

Fluids of the type defined in (A) are well known and many are commercially available. Fluids of the type defined in (B) are best prepared by the method defined in the copending application of J. Franklin Hyde et al. Serial Number 426,560, filed April 29, 1954, now Patent No. 2,779,776. Essentially this latter method comprises maintaining a siloxane in contact with certain monobasic aqueous acids such as HCl in a closed system until a constant viscosity of the siloxane is reached, and thereafter washing the siloxane free of acid. The illustrative R' radicals shown above are also suitable as the organic radicals in the (B) type fluids, and the most preferred radicals are again the methyl radicals. It is preferred that these hydroxylated fluids contain at least 0.02 percent by weight of silicon bonded OH groups. In those fluids which have about 2 organic radicals per silicon atom, the hydroxyl groups are presumably attached as end-blocking units on terminal Si atoms, thus the fluids would have the general formula $HO(R'_2SiO)_nH$. The preferred fluids of this type have values of $n$ ranging from about 250 to about 1500. When an appreciable amount of monoorganosiloxane units are present in the polymer, some of the OH groups can be present within the molecular chain as in the formula $$HO[R'_2SiO(R'SiO)R'_2SiO]_mH$$
$$\phantom{HO[R'_2SiO(R'SiO}|\phantom{)R'_2SiO]_mH}$$
$$\phantom{HO[R'_2SiO(R'S}OH$$

The upper viscosity limit of the fluids is 1,000,000 cs. at 25° C., but the lower limit of viscosity is not critical. Best results are obtained by employing a fluid having a viscosity of from 1,000 to 30,000 cs. at 25° C. and a hydroxyl content of from about 0.04 to 0.17 percent by weight.

The organosiloxanes which are optionally included in the emulsions of this invention are preferably fluid materials, but it is possible to employ organosiloxanes which are resinous or potentially resinous in nature, as long as they are soluble in an organic solvent so that a solution of the resin can be prepared for incorporation into the emulsion. Suitable solvents for the latter type or organosiloxane additives include benzene, toluene, xylene, and petroleum hydrocarbons.

The emulsifying agent employed herein can be any of the many well known agents which are suitable for emulsification of the organohydrogenosiloxanes (and the optional organopolysiloxanes) employed in this invention. Naturally it is preferred that those emulsifying agents be used which provide the most stable emulsions, both in respect to the separation of components and with respect to the cleavage of silicon bonded hydrogen. Examples of suitable emulsifying agents include cationic agents such as the quaternary ammonium halides, e.g. alkylaryl ammonium chlorides such as trimethylbenzyl ammonium chloride and hexadecyldimethylbenzyl ammonium chloride; amines, particularly the amine fatty acid condensates such as "Michelene 25" marketed by M. Michel and Co., and materials such as "Onyxsan HSB" marketed by the Onyx Oil and Chemical Co.; and various pyridinium complexes such as "Emcol E607S" marketed by the Emulsol Chemical Corp.

The most preferred emulsifying agents, however, are the non-ionic agents exemplified by the alkyl ethers of polyalkyleneglycols such as polypropylene glycol monobutyl ether, polyethylene glycol 2-ethylhexyl ether, and polyethylene glycol monobutyl ether; and esters of polyhydric alcohols such as glycerol monostearate, polyoxyethylenedistearate, and propylene glycol monolaurate. Suitable commercial nonionic agents include "Neutronyx 330," a soy bean fatty acid ester of polyethylene glycol marketed by Onyx Oil and Chemical Co.; "Renex 30," a polyoxyethylenetridecyl alcohol marketed by the Atlas Powder Co.; and "Tergitol TMN," a trimethylnonylether of polyethylene glycol marketed by Carbide and Carbon Chemical Co.

The amount of emulsifying agent employed is not critical, but an amount less than 50 percent by weight based on the weight of the total organosiloxanes present is ordinarily sufficient. Obviously it is advantageous to employ the minimum amount of any given agent necessary to provide a stable emulsion, and this amount will vary with the different agents employed as well as with the type and concentration of total organosiloxanes present in the emulsion, the amount and type of any organic resins which may be present, etc. Ordinarily a minimum of 1 percent by weight of emulsifying agent based upon the weight of the organosiloxanes present will be necessary.

The preferred manner of preparing the emulsions of this invention comprises emulsifying the organosiloxanes and water by any of the conventional and well known methods, and then adding an aqueous solution of the zirconium acetate and zinc acetate in the desired ratio, said solution preferably being one which has either been heated briefly or which has stood for a considerable length of time at room temperature prior to its incorporation in the emulsion. Any suitable means of agitation can be employed to incorporate the catalyst solution into the organosiloxane emulsion. An alternative method for the preparation of these emulsions is that of adding a solution of the zirconium acetate and a solution of zinc acetate separately to the organosiloxane emulsion. In the latter case it is preferred to add the zirconium acetate first because of the relatively unstable nature of the organosiloxane emulsion when it contains the zinc acetate alone.

For the most efficient use of manufacturing facilities it is preferred that the organosiloxane emulsion be prepared in a concentration of from 20 to 60 percent total organosiloxanes. Such relatively concentrated emulsions are also obviously more economical for shipment. Although such emulsions are occasionally used in their concentrated form for the treatment of fabrics, ordinarily it will be desirable to dilute the emulsion to a concentration of from 0.5 to 3 percent by weight of total organosiloxane content prior to its use upon a fabric. The zirconium acetate and zinc acetate can be added to the concentrated emulsion and then sufficient water added to bring the organosiloxane concentration down to the desired level, or alternatively the concentrated emulsion can be diluted to the desired extent and then the catalysts added. In either event, it is preferred to add the catalysts to the emulsion shortly before the treatment of fabrics with said emulsion.

Catalyzed emulsions prepared in accordance with this invention are stable for a period of at least 6 to 7 days;

thus allowing ample time after the addition of catalysts to treat substantial quantities of fabrics. It is often desirable to add a small amount of acetic acid, e.g. from 0.1 to 1.5 percent based upon the weight of the total organosiloxanes, to the uncatalyzed emulsion in order to provide maximum stability during shipping and storage. Since the acid does not interfere with the later use of the emulsion, it need not be removed prior to the addition of catalysts.

The compositions and method of this invention are applicable to the treatment of all natural and synthetic organic fabrics, such as nylon, cotton, wool, linen, silk, rayon, paper, polyacrylonitrile, vinylchloride-vinylidene chloride, and terephthalic acid-ethyleneglycol fabrics, as well as to fabrics which are blends of the above natural and synthetic materials. The compositions are also applicable to the treatment of non-organic fabrics such as those containing glass or asbestos fibers.

In general the compositions are applied to the fabrics in an amount such that there is a pick-up of from 0.1 to 5 percent by weight of the organosiloxanes based upon the dry weight of the fabric. For maximum water repellency combined with a minimum change in the initial appearance of the fabric it is preferred that the pick-up be from 1 to 2 percent by weight. Of course where a stiff fabric is not objectionable, or where a highly impregnated fabric is desired, the more concentrated emulsions can be used to provide a higher pick-up of organosiloxanes. The compositions of this invention can of course be applied to the fabrics by any of the conventional methods, such as by spraying, brushing, coating from rollers, dipping, "padding," "sponging" and the like.

After fabrics have been wetted with the emulsion of this invention, they are preferably cured at a temperature of at least 175° to 200° F. until they are dry. With most fabrics a sufficient cure can be obtained at 200° F. in about 6 minutes, although in some instances better results are obtained if a drying time of at least 10 minutes is employed. Naturally at 175° F. a longer curing time is required to achieve the same results as those obtained at 200° F. If the nature of the fabric is such that a relatively large amount of the emulsion has been absorbed or if a relatively concentrated emulsion has been employed to increase the total pick-up of organosiloxanes, the drying time at any given temperature should be increased accordingly. If the proper equipment is available, the curing temperature can be any temperature above 200° F. provided that the fabric itself will withstand the higher temperature. Thus, fabrics treated in accordance with this invention can be cured, if desired, by a very short exposure to temperatures in the region of 500° F.

It is conventional in the treatment of textiles with organosiloxane emulsions to employ additives such as colloidal silica, flame retardant chemicals, polyvinyl alcohol as a sizing agent, or aminoplast resins such as partially condensed urea-formaldehyde or melamine formaldehyde to impart crease resistance to the treated fabric. It is to be understood that the addition of such materials to the emulsions defined herein is within the scope of this invention.

The emulsions defined herein are also useful in the treatment of suede leather to render it water repellent. Best results are obtained in such treatments by employing the hydroxylated organopolysiloxane fluids in conjunction with the organohydrogenosiloxane, and by using as a catalyst (in addition to the defined zinc acetate-zirconium acetate mixture) a water soluble reaction product obtained from the reaction of from 1 to 4 mols of a di- or trialkanol amine in which the alkylene radicals contain from 2 to 6 inclusive carbon atoms (such as triethanolamine, diethanolamine, tributanolamine, or triisopropanolamine) with 1 mol of an alkyl titanate in which the alkyl radicals contain from 1 to 10 inclusive carbon atoms. The molecular structure of this reaction product is not known.

The preparation of such reaction products is described in detail in the copending application of John W. Gilkey, Serial Number 549,200, filed November 25, 1955, and assigned to the assignee of this invention. The disclosure of the latter application is hereby incorporated into the present specification. This reaction product is produced spontaneously upon mixing the alkanol amine with the alkyl titanate by means of an ester interchange type of reaction in which the corresponding alcohol is by-produced. This alcohol can either be removed from the reaction produced or left therein, but in either case the reaction product is water soluble.

It is preferred that where this alkanolaminetitanate reaction product is used, it be incorporated into the emulsions of this invention in an amount sufficient to provide from 0.5 to 10 percent by weight Ti (calculated as the elemental metal) based upon the weight of the organopolysiloxanes present. When this modified emulsion is applied to suede leather, the leather can be allowed to air dry at room temperature. If heat is employed to speed up the drying process, however, a relatively mild temperature (e.g. 200° F. or less) is preferably employed.

The following examples are illustrative only. All parts given are parts by weight.

EXAMPLE 1

An emulsion was prepared containing 18 parts of a trimethylsiloxy end-blocked methylhydrogenosiloxane having a viscosity of about 30 cs. at 25° C., 12 parts of an hydroxy end-blocked dimethylpolysiloxane having a viscosity of about 3,000 cs. at 25° C. and an hydroxy content of about 0.1 percent by weight, 2 parts of "Tergitol TMN" emulsifying agent, and 68 parts water. This emulsion is hereinafter designated "emulsion A." A catalyst solution was then prepared by adding 1 part of zinc acetate (in the form of the hydrate $Zn(O_2C_2H_3)_2 \cdot 2H_2O$) to 5 parts of an aqueous solution of zirconium acetate containing 9.7 percent by weight Zr, and heating the mixture at 50° C. for 15 minutes. This catalyst solution is hereinafter designated "catalyst A." A stable treating emulsion containing 1 percent total organosiloxanes was prepared by agitating a mixture of 3.3 parts of "emulsion A," 0.4 part of "catalyst A" and 96.3 parts water. Samples of cotton fabrics which were dipped in the latter emulsion, run through squeeze rollers, and then dried for 10 minutes at 200° F. were found to be highly water repellent. For a comparison, samples of the same fabrics were dipped in an emulsion prepared from 3.3 parts of "emulsion A," 96.4 parts water, and 0.3 part of the aqueous zirconium acetate containing 9.7 percent Zr, and then squeezed and dried as before. The latter samples, from which the zinc acetate had been omitted, showed no water repellency either after the 200° F. cure or after aging for 24 hours after the cure. If any tendency toward water repellency was present in the latter samples, it was apparently completely off-set by the wetting characteristics of the emulsifying agent probably retained on the cloth. Another emulsion was prepared for comparative purposes which contained 3.3 parts of "emulsion A," 96.4 parts water, and 0.3 part of the hydrated zinc acetate. The latter emulsion was too unstable to be practical for use as a commercial treatment.

EXAMPLE 2

Catalyst B was prepared by heating a mixture of 25 parts of the aqueous zirconium acetate containing 9.7 pecent Zr and 1 part of the hydrated zinc acetate for 15 mintues at 50° C. The resulting solution remained clear upon cooling and had a ratio of 0.17 zinc atom per zirconium atom. Catalyst C was prepared by heating a mixture of 25 parts of the aqueous zirconium acetate and 25 parts of the hydrated zinc acetate at 100° C. It required 45 minutes for the last of the zinc acetate to dissolve, providing a clear solution which almost immediately began to thicken into a creamy state. Upon cooling, a water soluble pinkish paste was obtained which had a ratio of 4.27 zinc atoms per zirconium atom. Two master emulsions (B and C) were prepared by mixing 30 parts of emulsion A from Example 1 with 10 parts of catalysts B and C respectively. These latter emulsions were then diluted to about 0.9 percent by weight total organosiloxanes by mixing 192 parts of water with 8 parts of emulsions B and C to form treating emulsions B' and C' respectively. Samples of cotton, acetate rayon, and wool fabrics were dipped in either the B' and C' emulsions, passed through squeeze rollers, and dried for 10 minutes at 200° F. Spray ratings were determined on the fabrics immediately after drying and again 48 hours after drying. The spray ratings were determined in accordance with Standard Test Method 22–52 described in "The 1954 Technical Manual and Year Book of the American Association of Textile Chemists and Colorists," vol. 30, pp. 136–138, in which test 100 indicates the best possible repellancy in a scale ranging from 0 to 100, with 0 indicating complete wetting of the sample. The results obtained are shown in Table I below.

*Table I*

| Emulsion | Cotton | | Rayon | | Wool | |
|---|---|---|---|---|---|---|
| | Initial | 48 Hrs. | Initial | 48 Hrs. | Initial | 48 Hrs. |
| B' | 80 | 100 | 90 | 100 | 100 | 100 |
| C' | 80 | 90+ | 100 | | 100 | 100 |

EXAMPLE 3

An emulsion was prepared by agitating 9.98 parts of the "emulsion A" and 1 part of the "catalyst A" from Example 1, with 0.02 part glacial acetic acid and 139 parts water. The emulsion was allowed to stand for 1 week, and remained stable during this period. At the end of the week samples of wool were dipped in the emulsion, passed through squeeze rollers, and dried at 190° F. for 10 minutes. The spray rating on these samples was 100.

EXAMPLE 4

An emulsion was prepared from 10 parts of "emulsion A," 10 parts of "catalyst A" and 280 parts water. Another emulsion was prepared from 10 parts of "emulsion A," 0.1 part of "catalyst A," and 289.9 parts water. Highly water repellent wool fabrics were obtained by dipping the fabric in either emulsion and curing it at 200° F. for 10 minutes, but that which was treated with the second emulsion required 48 hours aging after the cure to develop maximum water repellency.

EXAMPLE 5

An emulsion was prepared containing 12 parts of a methylhydrogenopolysiloxane having a viscosity of about 100 cs. at 25° C., 18 parts of a trimethylsiloxy end-blocked dimethylpolysiloxane having a viscosity of about 13,000 cs. at 25° C., 1 part "Tergitol TMN," 1 part "Tergitol NPX" (an alkylphenylether of polyethylene glycol), 0.2 part glacial acetic acid, and 67.8 parts water. When 10 parts of this emulsion, 1 part "catalyst A," and 289 parts water were mixed to form a dilute emulsion, fabrics impregnated therewith and cured at 200° F. showed a high degree of water repellency.

EXAMPLE 6

An emulsion was prepared identical to "emulsion A" except that 2 parts of polyvinyl alcohol were used in place of the "Tergitol TMN." A mixture of 10 parts of this emulsion, 1 part of "catalyst A," and 139 parts water was agitated to provide an emulsion containing 2 percent by weight of total organosiloxanes. Wool fabrics dipped in this emulsion and dried at 250° F. for 10 minutes were found to have a spray rating of 100.

EXAMPLE 7

A 15 g. sample of suede leather, roughly 16 square inches in area, was tumbled for one hour in an emulsion made from 400 g. water, 4.5 g. "emulsion A," and 0.255 g. of the reaction mass obtained by mixing 2 mols of triethanolamine with 1 mol of tetraisopropyl titanate. 1.147 g. of "catalyst A" was then added and the tumbling continued for an additional hour. The leather was then removed and air dried for 7 days, after which time it was found to have a spray rating of 100. Dry cleaning the leather only reduced the spray rating to 90.

EXAMPLE 8

An emulsion was prepared containing 24 parts of a phenyldiethylsiloxy end-blocked methylhydrogenosiloxane having a viscosity of about 100 cs. at 25° C., 6 parts of an organosiloxane copolymer containing 1 molar percent phenyldimethylsiloxane units, 5 molar percent methylvinylsiloxane units and 94 molar percent dimethylsiloxane units, said copolymer having a viscosity of about 5000 cs. at 25° C., 2 parts of "Tergitol TMN" emulsifying agent, and 68 parts water. A sufficient amount of an aqueous solution of zirconium acetate containing 9.7 percent by weight Zr was added to the emulsion to provide 3 percent by weight Zr based on the weight of the total organosiloxane present and the emulsion was agitated. To this modified emulsion there was then added a sufficient amount of an aqueous solution of zinc acetate to provide 1 zinc atom per zirconium atom and the mixture was again agitated. The resulting emulsion was allowed to stand at room temperature for 6 days and then sufficient water was added, with agitation, to provide a treating emulsion containing a total of 1 percent by weight of total organosiloxanes. When woolen, rayon, or nylon fabrics were dipped in this emulsion and cured for 10 minutes at 200° F. they were found to be highly water repellent.

That which is claimed is:

1. An aqueous emulsion in which the nonaqueous constituents are comprised of (1) an organopolysiloxane fluid having the general formula

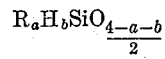

where R is selected from the group consisting of alkyl radicals of from 1 to 5 inclusive carbon atoms and aryl radicals, there being not more than 10 molar percent of aryl substituted Si atoms present, $a$ has a value of from 1.0 to 1.5 inclusive, $b$ has a value of from 0.75 to 1.25 inclusive, and the sum of $a$ and $b$ has a value of from 2.0 and 2.25 inclusive, (2) zirconium acetate and zinc acetate in a ratio of from 0.1 to 4.5 inclusive zinc atoms per zirconium atom, and (3) an emulsifying agent.

2. A method of rendering an organic fabric water repellent which comprises impregnating the fabric with the emulsion of claim 1 and drying the impregnated fabric at a temperature of at least 175° F. until said fabric is dry.

3. An aqueous emulsion in which the nonaqueous constituents consist essentially of (1) a mixture of from 5 to 80 percent by weight of an organopolysiloxane fluid of the general formula

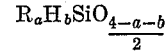

where R is selected from the group consisting of alkyl radicals of from 1 to 5 inclusive carbon atoms and aryl radicals, there being not more than 10 molar percent of aryl substituted Si atoms present, $a$ has a value of from 1.0 to 1.5 inclusive, $b$ has a value of from 0.75 to 1.25 inclusive, and the sum of $a$ and $b$ has a value of from 2.0 to 2.25 inclusive, and from 20 to 95 percent by weight of an organopolysiloxane fluid selected from the group consisting of (A) fluid organopolysiloxanes having a viscosity of from 1,000 to 100,000 cs. at 25° C. and having the general formula $$R'_x SiO_{\frac{4-x}{2}}$$

where R' is selected from the group consisting of aliphatic hydrocarbon radicals of from 1 to 5 inclusive carbon atoms and aryl radicals, there being not more than 10 molar percent of aryl substituted Si atoms present, and $x$ has a value of from 2.0 to 2.1 inclusive and (B) hydroxylated organopolysiloxane fluids having a viscosity of less than 1,000,000 cs. at 25° C. and having an average of from 1.4 to 2 inclusive organic radicals attached to silicon per silicon atom, said organic radicals being selected from the group consisting of aliphatic hydrocarbon radicals of from 1 to 5 inclusive carbon atoms and aryl radicals, there being not more than 10 molar percent of aryl substituted Si atoms present, (2) zirconium acetate in an amount sufficient to provide from 0.25 to 30 percent by weight zirconium calculated as the elemental metal based upon the weight of total organopolysiloxanes present and zinc acetate in an amount sufficient to provide from 0.1 to 4.5 zinc atoms per zirconium atom, and (3) an emulsifying agent.

4. An emulsion in accordance with claim 3 wherein the zirconium acetate and zinc acetate are heated in aqueous solution at a temperature of from 35 to 100° C. prior to their incorporation in the emulsion.

5. An emulsion in accordance with claim 3 wherein R, R', and the organic radicals in the hydroxylated polysiloxane all are methyl radicals.

6. A method of rendering an organic fabric water repellent which comprises impregnating the fabric with the emulsion of claim 3 and drying the impregnated fabric at a temperature of at least 175° F. until said fabric is dry.

7. An aqueous emulsion in which the nonaqueous constituents consist essentially of (1) a mixture of from 5 to 80 percent by weight of an organopolysiloxane fluid having the general formula $$(CH_3)_a H_b SiO_{\frac{4-a-b}{2}}$$

where $a$ has a value of from 1.0 to 1.5 inclusive, $b$ has a value of from 0.75 to 1.25 inclusive and the sum of $a$ and $b$ has a value of from 2.0 to 2.25 inclusive, and from 20 to 95 percent by weight of an hydroxylated methylpolysiloxane fluid containing at least 0.02 percent by weight of silicon bonded hydroxyl groups, having an average of from 1.98 to 2 inclusive methyl groups per silicon atom and having a viscosity of from 1,000 to 30,000 cs. at 25° C., (2) zirconium acetate in an amount sufficient to provide from 1 to 7 percent by weight zirconium calculated as the elemental metal based upon the weight of the total organopolysiloxanes present and zinc acetate in an amount sufficient to provide from 0.5 to 1 zinc atom per zirconium atom, and (3) an emulsifying agent.

8. An emulsion in accordance with claim 7 wherein the emulsifying agent is a trimethylnonylether of polyethyleneglycol.

9. A method of rendering an organic fabric water repellent which comprises impregnating the fabric with the emulsion of claim 8 and drying the impregnated fabric at a temperature of about 200° F. until said fabric is dry.

10. A composition comprising an aqueous solution of the reaction product formed by contacting zirconium acetate with zinc acetate in an aqueous solution at a temperature of from 35 to 100° C., the aforesaid zirconium acetate and zinc acetate being present in amounts such that there is from 0.1 to 4.5 zinc atoms per zirconium atom.

11. In the method for the treatment of an organic fabric with an aqueous emulsion of an organohydrogenopolysiloxane to render said fabric water repellent, the improvement which comprises incorporating into the emulsion prior to contacting said fabric therewith a mixture of (1) zirconium acetate in an amount sufficient to provide from 0.25 to 30 percent by weight zirconium calculated as the elemental metal based upon the weight of the total organopolysiloxanes present and (2) zinc acetate in an amount sufficient to provide from 0.1 to 4.5 zinc atoms per zirconium atom, and drying said fabric at a temperature of at least 175° F.

12. A method for rendering suede leather water repellent which comprises wetting said leather with an aqueous emulsion in which the nonaqueous constituents consist essentially of (1) a mixture of from 5 to 80 percent by weight of an organopolysiloxane fluid having the general formula $$(CH_3)_a H_b SiO_{\frac{4-a-b}{2}}$$

where $a$ has a value of from 1.0 to 1.5 inclusive, $b$ has $b$ has a value of from 0.75 to 1.25 inclusive and the sum of $a$ and $b$ has a value of from 2.0 to 2.25 inclusive, and from 20 to 95 percent by weight of an hydroxylated methylpolysiloxane fluid containing at least 0.02 percent by weight of silicon bonded hydroxyl groups, having an average of from 1.98 to 2 inclusive methyl groups per silicon atom and having a viscosity of from 1,000 to 30,000 cs. at 25° C., (2) zirconium acetate in an amount sufficient to provide from 1 to 7 percent by weight zirconium calculated as the elemental metal based upon the weight of the total organopolysiloxanes present and zinc acetate in an amount sufficient to provide from 0.5 to 1 zinc atom per zirconium atom, (3) an emulsifying agent, and (4) the water soluble reaction product produced by the reaction of from 1 to 4 mols of an alkanol amine containing from 2 to 3 inclusive alkanol groups per molecule and in which the alkylene radicals contain from 2 to 6 inclusive carbon atoms with 1 mol of an alkyl titanate in which the alkyl radicals contain from 1 to 10 inclusive carbon atoms, said reaction product being present in an amount sufficient to provide from 0.5 to 10 percent by weight titanium calculated as the elemental metal based upon the weight of (1), and drying the leather so wetted.

References Cited in the file of this patent

UNITED STATES PATENTS

| | | |
|---|---|---|
| 2,588,365 | Dennett | Mar. 11, 1952 |
| 2,588,366 | Dennett | Mar. 11, 1952 |
| 2,588,393 | Kauppi | Mar. 11, 1952 |
| 2,687,388 | McNulty et al. | Aug. 24, 1954 |
| 2,718,483 | Clark | Sept. 20, 1955 |
| 2,728,692 | Dennett | Dec. 27, 1955 |
| 2,743,192 | White | Apr. 24, 1956 |
| 2,798,858 | Brown | July 9, 1957 |
| 2,803,613 | Kather et al. | Aug. 20, 1957 |
| 2,803,614 | Solomon | Aug. 20, 1957 |

UNITED STATES PATENT OFFICE
CERTIFICATE OF CORRECTION

Patent No. 2,927,870 March 8, 1960

Hervey F. Beutler

It is hereby certified that error appears in the printed specification of the above numbered patent requiring correction and that the said Letters Patent should read as corrected below.

Column 4, line 31, for "oxylated" read -- alkoxylated --.

Signed and sealed this 6th day of September 1960.

(SEAL)
Attest:
ERNEST W. SWIDER
Attesting Officer

ROBERT C. WATSON
Commissioner of Patents